US012296437B2

(12) United States Patent
Moore et al.

(10) Patent No.: US 12,296,437 B2
(45) Date of Patent: May 13, 2025

(54) SYSTEMS AND METHODS FOR SUPPORTING A WORKPIECE IN A MANUFACTURING ENVIRONMENT

(71) Applicant: The Boeing Company, Chicago, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/971,718

(22) Filed: Oct. 24, 2022

(65) Prior Publication Data

US 2023/0138621 A1 May 4, 2023

Related U.S. Application Data

(60) Provisional application No. 63/275,005, filed on Nov. 3, 2021.

(51) Int. Cl.
*B25B 11/02* (2006.01)
*B64F 5/10* (2017.01)
*B64F 5/50* (2017.01)

(52) U.S. Cl.
CPC ............... *B25B 11/02* (2013.01); *B64F 5/50* (2017.01); *B64F 5/10* (2017.01)

(58) Field of Classification Search
CPC ....... B64F 5/10; B64F 5/50; B66F 7/10–7/14; B25B 11/02; B23P 2700/01; B23P 21/004;
(Continued)

(56) References Cited

U.S. PATENT DOCUMENTS 3,961,712 A * 6/1976 Bartley .................. B66C 17/00
 212/315
4,382,728 A 5/1983 Anderson et al.
(Continued)

FOREIGN PATENT DOCUMENTS

CN 206579860 10/2017
CN 110239741 9/2019
(Continued)

OTHER PUBLICATIONS

Translation of DE202008013438 (Year: 2010).*
(Continued)

*Primary Examiner* — Matthew P Travers
(74) *Attorney, Agent, or Firm* — Walters & Wasylyna LLC

(57) ABSTRACT

A system includes a support beam elongated along a longitudinal axis. The support beam includes a first end portion longitudinally opposed from a second end portion, a first beam-side indexing feature proximate the first end portion, and a second beam-side indexing feature proximate the second end portion. The system further includes a first frame assembly having a first base portion, a first riser portion defining a first vertical axis, and a first carriage connected to the first riser portion and moveable relative to the first riser portion along the first vertical axis. The system further includes a second frame assembly having a second base portion, a second riser portion defining a second vertical axis, and a second carriage to the second riser portion and moveable relative to the second riser portion along the second vertical axis.

20 Claims, 15 Drawing Sheets

(58) Field of Classification Search
CPC ........ B21J 15/142; B66C 17/00; B66C 17/06; B66C 19/00
See application file for complete search history.

(56) References Cited

U.S. PATENT DOCUMENTS

| | | | |
|---|---|---|---|
| 4,486,128 A | 12/1984 | Baker et al. | |
| 5,088,609 A | 2/1992 | Fryc | |
| 5,701,651 A * | 12/1997 | Groves | B23Q 5/40 |
| | | | 269/910 |
| 5,817,269 A | 10/1998 | Younie et al. | |
| 6,430,796 B1 | 8/2002 | Jones et al. | |
| 7,273,333 B2 | 9/2007 | Buttrick et al. | |
| 7,334,673 B2 | 2/2008 | Boberg et al. | |
| 7,574,933 B2 | 8/2009 | Hazlehurst et al. | |
| 8,005,563 B2 | 8/2011 | Cobb et al. | |
| 8,606,388 B2 | 12/2013 | Cobb et al. | |
| 8,620,470 B2 | 12/2013 | Cobb et al. | |
| 8,733,707 B2 | 5/2014 | Stone | |
| 9,132,924 B2 | 9/2015 | Stark et al. | |
| 9,651,935 B2 | 5/2017 | Stone | |
| 9,981,367 B2 | 5/2018 | Nestleroad et al. | |
| 10,442,153 B2 | 10/2019 | Shinozaki et al. | |
| 10,520,933 B2 | 12/2019 | Stone et al. | |
| 10,710,327 B2 | 7/2020 | Butler | |
| 10,711,815 B2 | 7/2020 | Chan et al. | |
| 10,723,485 B2 | 7/2020 | Moore et al. | |
| 10,906,158 B2 | 2/2021 | Newton | |
| 10,919,746 B2 | 2/2021 | Harada | |
| 11,007,766 B2 | 5/2021 | Bye | |
| 2008/0084018 A1 | 4/2008 | Baumann et al. | |
| 2010/0011563 A1 | 1/2010 | Burns et al. | |
| 2010/0038024 A1 | 2/2010 | Brandt | |
| 2010/0135754 A1 * | 6/2010 | Weber | B64F 5/10 |
| | | | 414/222.04 |
| 2016/0167724 A1 * | 6/2016 | Kilibarda | B62D 65/022 |
| | | | 29/401.1 |
| 2019/0084193 A1 | 3/2019 | Riedel | |
| 2019/0248514 A1 * | 8/2019 | Kirkham | B64F 5/50 |

FOREIGN PATENT DOCUMENTS

| | | | |
|---|---|---|---|
| DE | 202008013438 U1 * | 4/2010 | ............... B64F 5/10 |
| DE | 10 2013006506 | 10/2014 | |
| WO | WO 03/037564 | 5/2003 | |

OTHER PUBLICATIONS

Netherlands Patent Office, Search Report and Written Opinion, App. No. NL2029840 (Jul. 29, 2022).

European Patent Office, Extended European Search Report, App. No. 22200688.4 (Mar. 16, 2023).

\* cited by examiner

SYSTEMS AND METHODS FOR SUPPORTING A WORKPIECE IN A MANUFACTURING ENVIRONMENT

PRIORITY

This application claims priority from U.S. Ser. No. 63/275,005 filed on Nov. 3, 2021.

FIELD

This application relates to the manufacturing of structures and, more specifically, to methods and systems for supporting aerospace structures during manufacturing.

BACKGROUND

Manufacturing of large structures in the aerospace industry typically requires manual processing, manually placing the structure into a workstation, and manually moving it out of the workstation Challenges arise related to proper orientation and support of large structures within a work cell, specifically in work cells utilizing overhead mechanical equipment. Other difficulties arise related to movement of large structures into and out of work cells, and more particularly to automated transfer of large structures.

Accordingly, those skilled in the art continue with research and development efforts in the field of manufacturing large aerospace structures.

SUMMARY

Disclosed are systems for supporting a workpiece in a manufacturing environment.

In one example, the disclosed system includes a support beam elongated along a longitudinal axis. The support beam includes a first end portion and a second end portion longitudinally opposed from the first end portion. The support beam also includes a first beam-side indexing feature proximate the first end portion and a second beam-side indexing feature proximate the second end portion. The system further includes a first frame assembly having a first base portion, a first riser portion defining a first vertical axis, and a first carriage. The first carriage is connected to the first riser portion and moveable relative to the first riser portion along the first vertical axis. The first carriage includes a first frame-side indexing feature configured to engage with the first beam-side indexing feature. The system further includes a second frame assembly having a second base portion, a second riser portion defining a second vertical axis, and a second carriage. The second carriage is connected to the second riser portion and moveable relative to the second riser portion along the second vertical axis. The second carriage includes a second frame-side indexing feature configured to engage with the second beam-side indexing feature.

In another example, the disclosed system includes a support beam elongated along a longitudinal axis. The support beam has a first end portion and second end portion longitudinally opposed from the first end portion. The support beam includes a first male indexing feature proximate the first end portion and a second male indexing feature proximate the second end portion. The system further includes a first frame assembly located within one work cell of a plurality of work cells. The first frame assembly has a first base portion, a first riser portion defining a first vertical axis, and a first carriage, the first carriage being connected to the first riser portion and moveable relative to the first riser portion along the first vertical axis. The first carriage has a first female indexing feature configured to engage with the first male indexing feature. The system further includes a second frame assembly located within the one work cell of the plurality of work cells. The second frame assembly has a second base portion, a second riser portion defining a second vertical axis, and a second carriage. The second carriage is connected to the second riser portion and is moveable relative to the second riser portion along the second vertical axis. The second carriage includes a second female indexing feature configured to engage with the second male indexing feature.

Also disclosed are methods for supporting a workpiece in a manufacturing environment.

In one example, the disclosed method includes connecting the workpiece to a support beam. The method further includes engaging the support beam with a first frame assembly. The method further includes engaging the support beam with a second frame assembly. The engaging the support beam with the first frame assembly and the second frame assembly includes indexing the support beam with the first frame assembly and the second frame assembly.

Other examples of the disclosed systems and methods for supporting a workpiece in a manufacturing environment will become apparent from the following detailed description, the accompanying drawings, and the appended claims.

DETAILED DESCRIPTION

Figure 1:
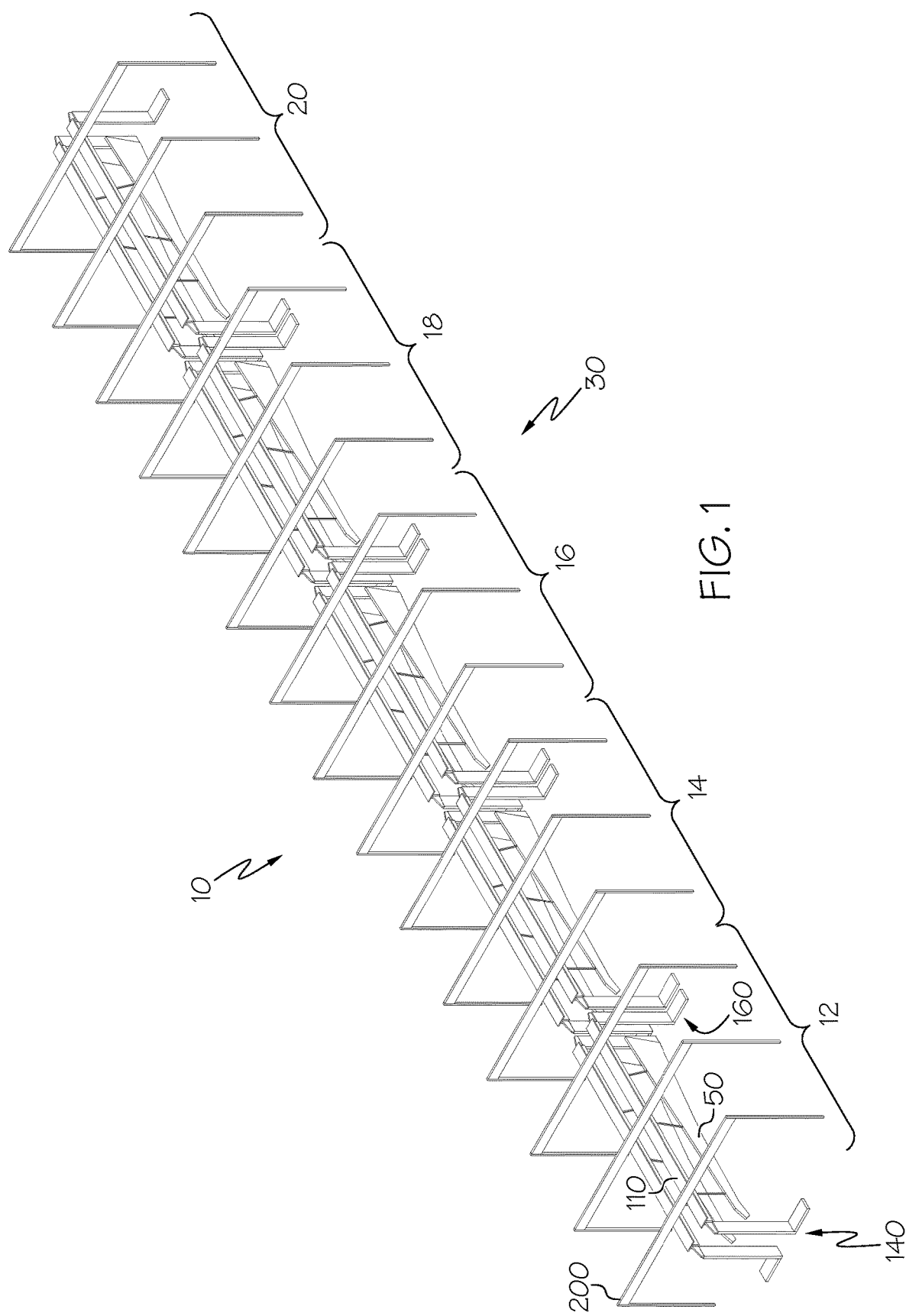
FIG. 1 is a perspective view of a system for supporting a workpiece in a manufacturing environment.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

References throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

Disclosed are automated methods and systems for orienting a workpiece in a cell, supporting a strong back beam using a structure, such as a J-frame, and moving a workpiece from one cell to the next cell. The supporting structure includes fixed points attached to an overhead structure. The supporting structures are used at each cell location as a part of the indexing of a workpiece along with adjustable arms/straps to connect to the overhead equipment.

The supporting structure provides the capability to precisely orient the workpiece in the cell. Utilizing rail-based machine beds, a metrology reinforced coordinate system is produced. Metrology cycles, part positioning cycles, and machine re-initialization cycles may be performed at any time in any combination to optimize the process. The structure provides the capability to change the elevation of the workpieces in the manual work cells for the purposes of ergonomic optimization. The structure further allows the overhead equipment to be supported while other components, such as bridges, are \ swapped out and/or recycled thereby providing a method of de-conflicting and re-cycling the overhead gantry system. The structure may further allow the overhead equipment to be lowered onto transportation carts for storage and maintenance as required.

The disclosed system 100 and method 1000 may utilize a control system 600. The control system may utilize a supervisory control and data acquisition (SCADA) based controller. The supervisory control and data acquisition (SCADA) based controller for the disclosed system 100 and method 1000 utilize feedback control to ensure proper movement between the plurality of work cells 30. The system 100 and method 1000 may be automated such that each step of the method 1000 is performed automatically based upon data 929 analysis and commands received from a control system 600. Further, any reference to moving or a movable component of the disclosed system 100 and method 1000 may refer to automated movement based upon workpiece 50 geometry and position within the system 100. For example, movement may automatically occur to position the workpiece 50 in a desired location within a work cell 12, 14, 16, 18, 20, . . . n, etc. of the system 100 for the work to be performed in that work cell on that particular shape and size of workpiece 50. Movement may include movement along any axis or plane needed to position the workpiece 50 properly within the work cell.

Disclosed is a system 100 for supporting a workpiece 50 in a manufacturing environment 10, as shown in FIG. 1. In one example, the manufacturing environment 10 includes a plurality of work cells 30, see FIG. 1. The plurality of work cells 30 includes, individually, work cells 12, 14, 16, 18, 20, . . . n, etc. At least one work cell 12, 14, 16, 18, 20, . . . n etc. of the plurality of work cells 30 includes a first frame assembly 140 and a second frame assembly 160 such that each are located within one work cell (e.g., 20) of the plurality of work cells 30.

Figure 13:
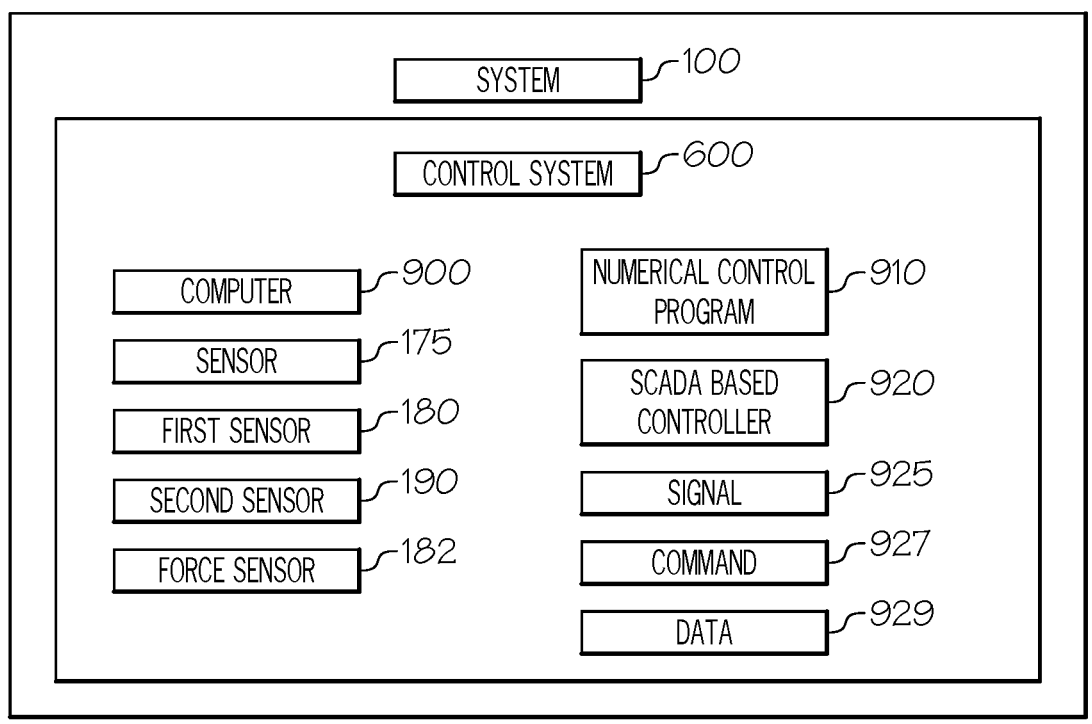
FIG. 13 is a block diagram of the system of FIG. 1.

In one example, the system 100 includes a control system 600, as shown in FIG. 13. The control system 600 includes a computer 900. The computer 900 may utilize one or more numerical control program 910 to direct movement of the workpiece 50 within a work cell of the plurality of work cells 30 or between the plurality of work cells 30. The control system 600 may utilize a supervisory control and data acquisition (SCADA) based controller 920 to direct movement and facilitate data 929 analysis.

Figure 2:
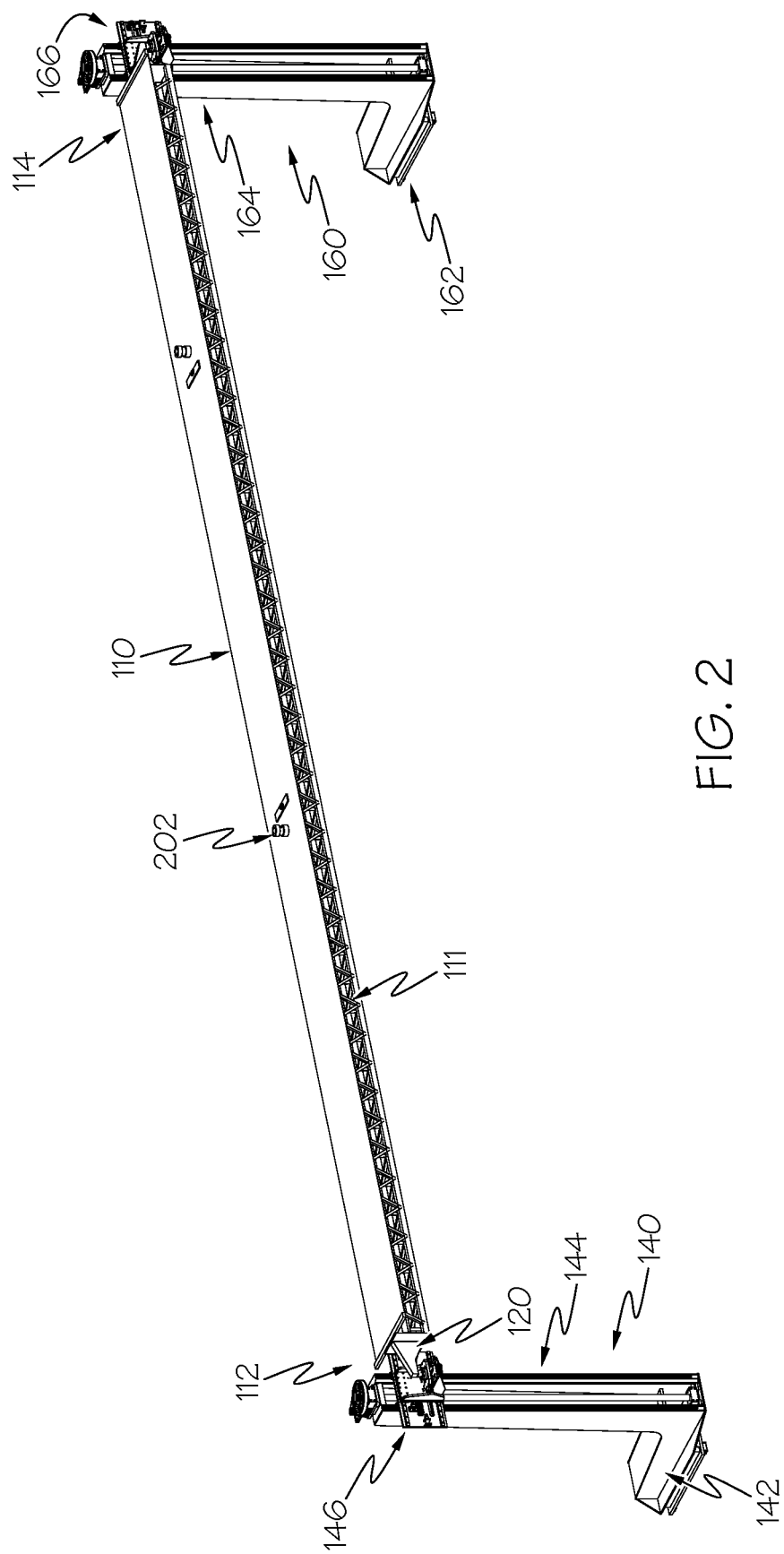
FIG. 2 is a perspective view of a portion of the system of FIG. 1.
Figure 4:
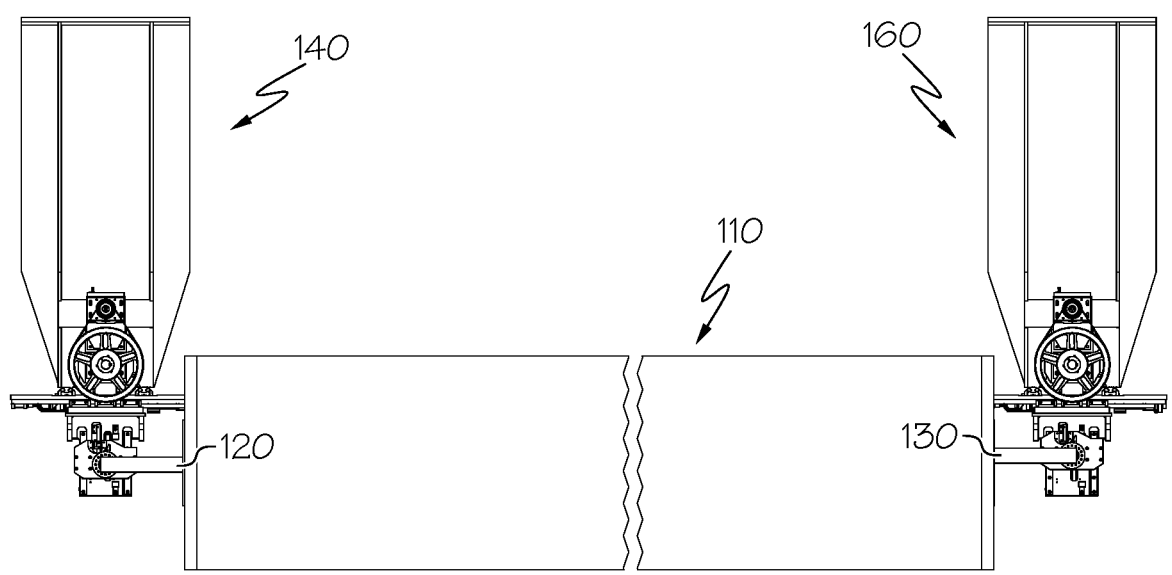
FIG. 4 is a top plan view of a portion of the system of FIG. 1.

Referring to FIG. 2, the system 100 includes a support beam 110. The support beam 110 is elongated along a longitudinal axis L. The support beam 110 may include a truss 111. The support beam 110 includes a first end portion 112 and a second end portion 114. The second end portion 114 is longitudinally opposed from the first end portion 112. The support beam 110 includes a first beam-side indexing feature 120 proximate the first end portion 112 and a second beam-side indexing feature 130 proximate the second end portion 114, see FIG. 4. In one example, the support beam 110 includes a metallic material and is substantially rigid.

Referring to FIG. 2, the system 100 includes a first frame assembly 140. The first frame assembly 140 may be generally L-shaped or J-shaped. The first frame assembly 140 includes a first base portion 142. The first frame assembly 140 further includes a first riser portion 144. The first riser portion 144 defines a first vertical axis $V_1$. In one example, the first riser portion 144 and the first base portion 142 are integral such that the first frame assembly 140 is a single, monolithic piece.

Still referring to FIG. 2, the system 100 includes a first carriage 146. The first carriage 146 is connected to the first riser portion 144 of the first frame assembly 140. The first carriage 146 is moveable relative to the first riser portion 144 along the first vertical axis $V_1$. For example, the first carriage 146 may be movable via any mechanical means such as automated movement via a command 927 from control system 600, manual movement, or a combination thereof. The first carriage 146 includes a first frame-side indexing feature 148 configured to engage with the first beam-side indexing feature 120.

Referring to FIG. 2, the system 100 includes a second frame assembly 160. The second frame assembly 160 may be generally L-shaped or J-shaped. The second frame assembly 160 includes a second base portion 162 and a second riser portion 164. In one example, the second base portion 162 and the second riser portion 164 are integral such that the second frame assembly 160 is a single, monolithic piece. The second riser portion 164 defines a second vertical axis $V_2$. The system 100 further includes a second carriage 166. The second carriage 166 is connected to the second riser portion 164 and is moveable relative to the second riser portion 164 along the second vertical axis $V_2$. The second carriage 166 includes a second frame-side indexing feature 168 configured to engage with the second beam-side indexing feature 130.

Figure 7:
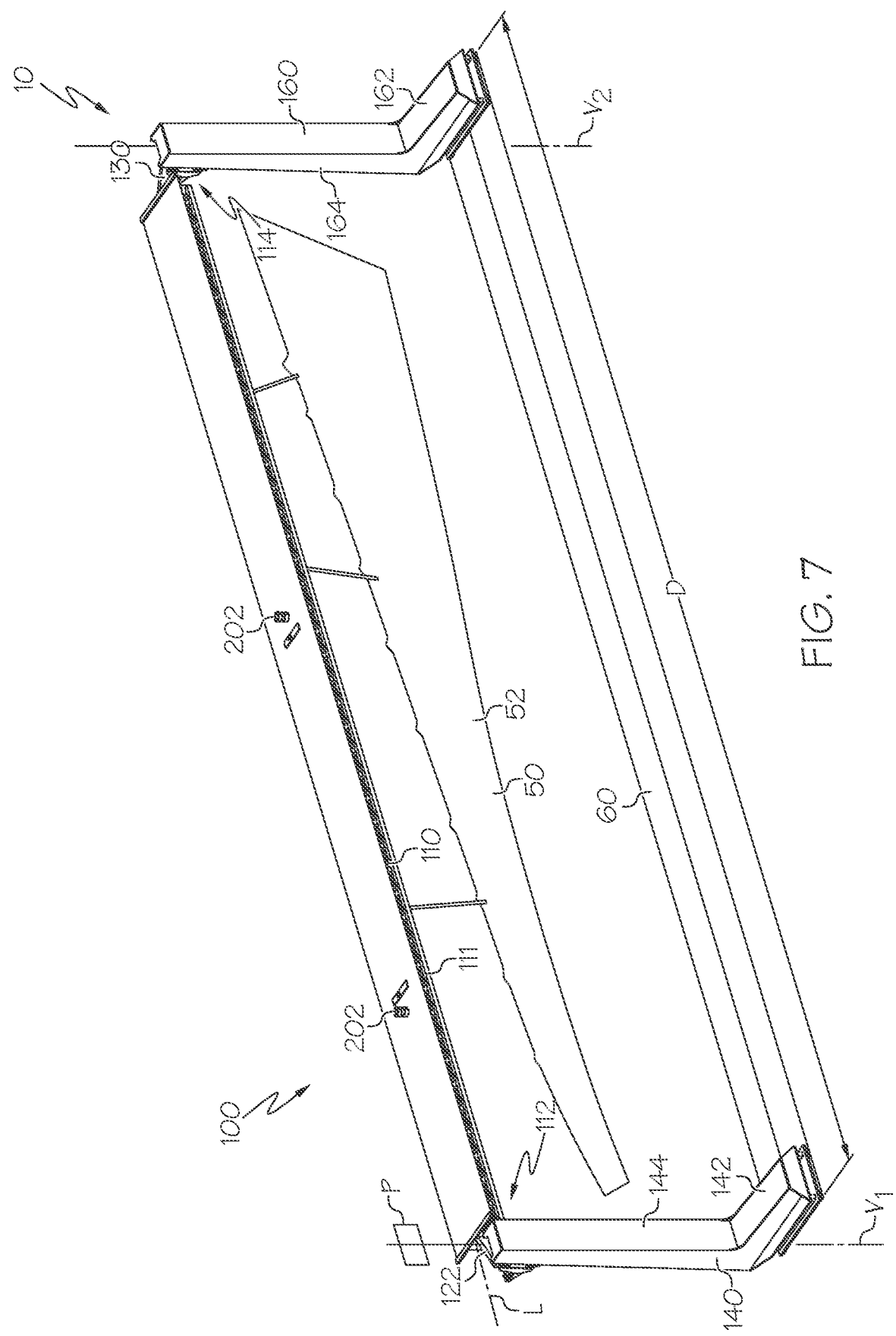
FIG. 7 is a perspective view of a portion of the system of FIG. 1.
Figure 11:
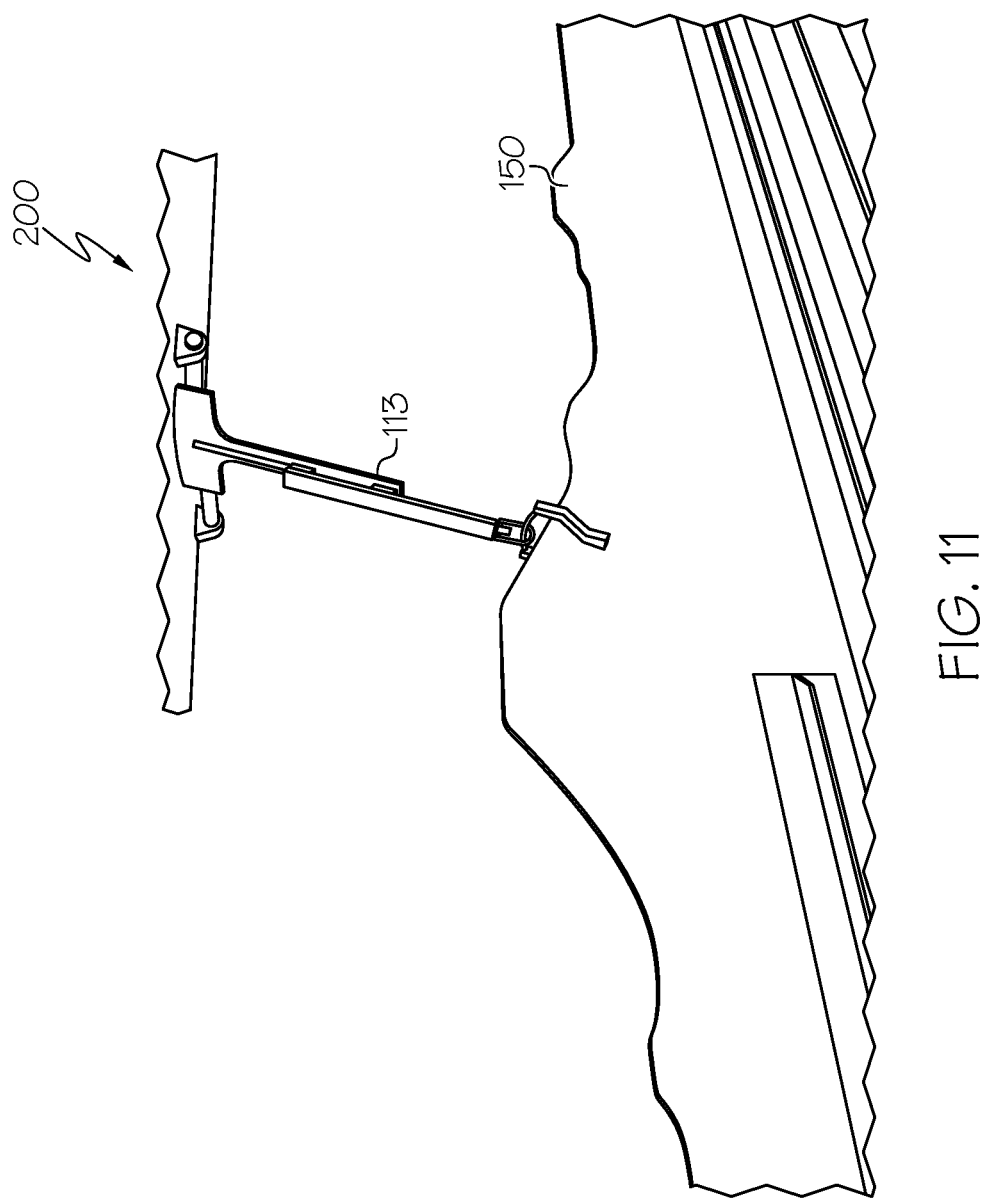
FIG. 11 is a perspective view of a portion of the system of FIG. 1.

Referring to FIG. 7, the workpiece 50 is suspended from the support beam 110. The system 100 may include a hanger 113 connected to the support beam 110, see FIG. 11. The hanger 113 may be located for hanging the workpiece 50 from the support beam 110.

Figure 15:
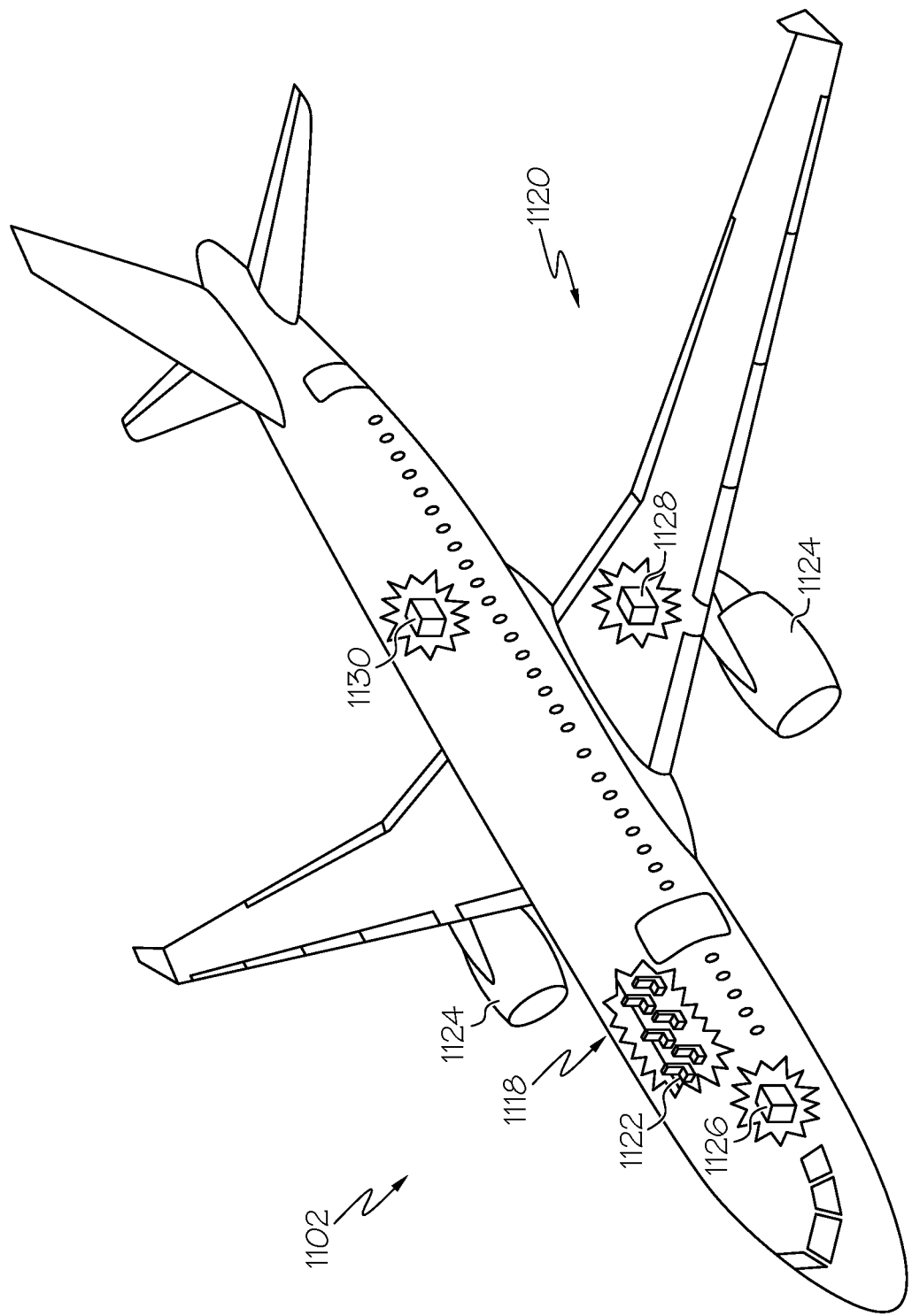
FIG. 15 is a schematic illustration of an aircraft.

In one example, the workpiece 50 is a wing panel 52 of an aircraft 1102, as shown in FIG. 15. The workpiece 50 may include a composite material. The composite material may include a reinforcement material embedded in a polymeric matrix material, such as carbon fibers embedded in a thermoset (or thermoplastic) resin.

In one example, the first base portion 142 of the first frame assembly 140 is fixedly connected to an underlying floor 60 (e.g., a factory floor). Further, the second base portion 162 of the second frame assembly 160 is fixedly connected to the underlying floor 60 (e.g., a factory floor). In another example, both the first base portion 142 of the first frame assembly 140 and the second base portion 162 of the second frame assembly 160 are fixedly connected to the underlying floor 60.

Referring to FIG. 7, the first frame assembly 140 is spaced a distance D apart from the second frame assembly 160. In one example, the distance D is at least about 1 meter. In another example, the distance D is at least about 2 meters. In another example, the distance D is at least about 3 meters. In yet another example, the distance D is greater than about 3 meters.

Figure 8:
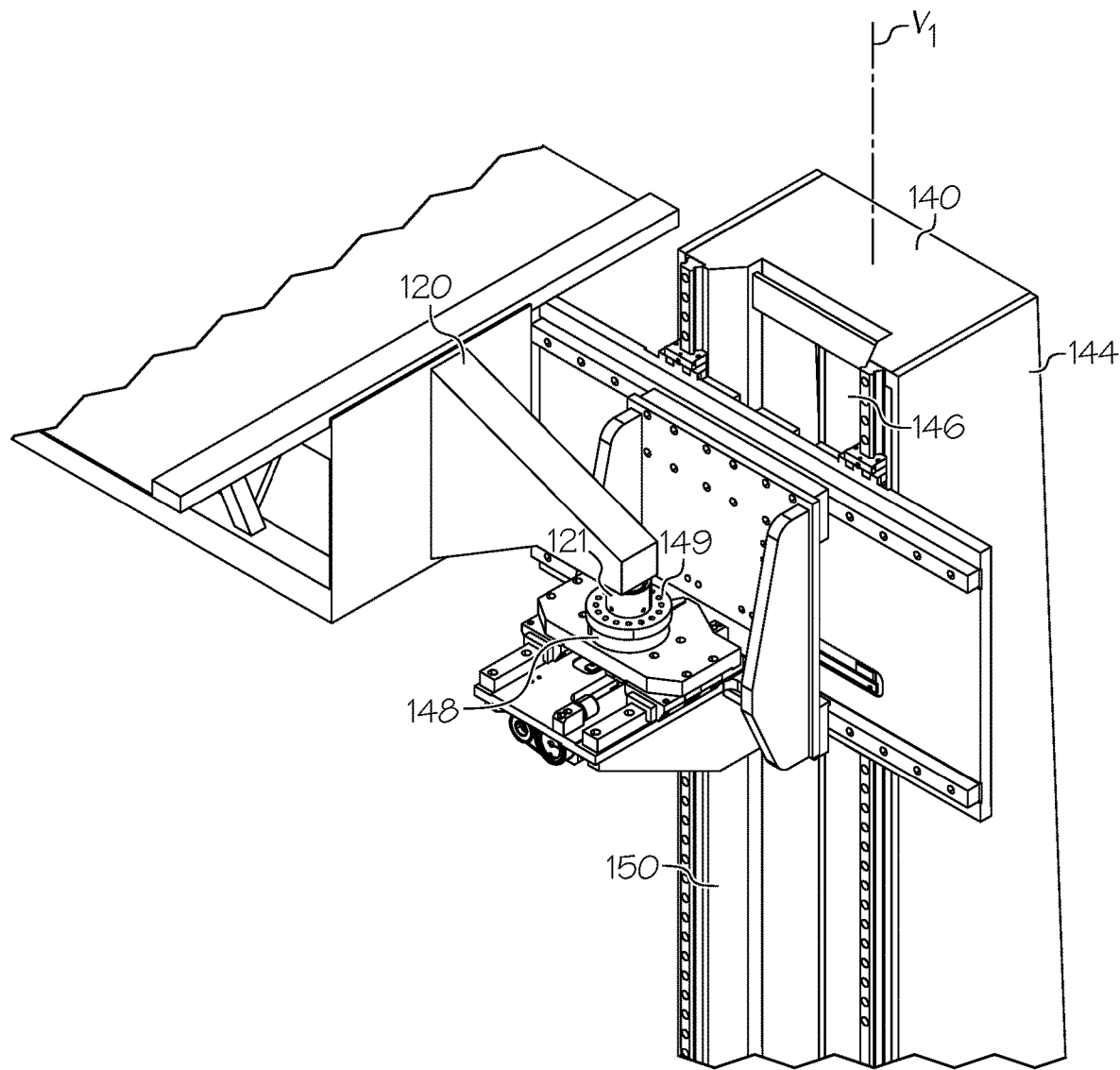
FIG. 8 is a perspective view of a portion of the system of FIG. 1.

Referring to FIG. 8, in one example, the first riser portion 144 of the first frame assembly 140 includes a first track 150. The first carriage 146 may be configured to engage with the first track 150 and to move relative to the first riser portion 144 along the first track 150 (i.e., the first carriage 146 may be moveable relative to the first riser portion 144).

Figure 5:
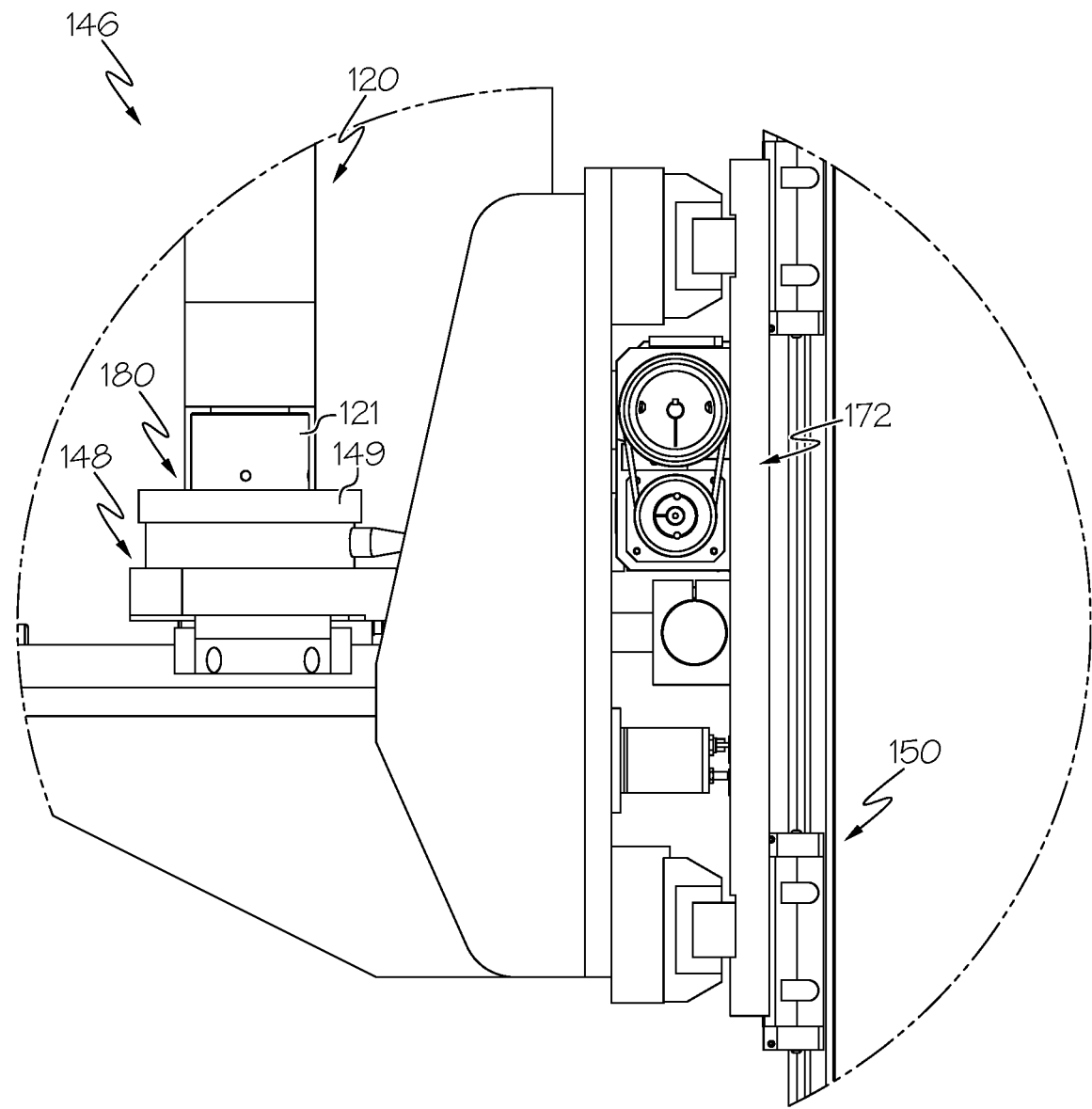
FIG. 5 is a side cross-sectional view of a portion of the system of FIG. 1.

The system 100 may include a motor 172, which may be configured to selectively effect movement of the first carriage 146 along the first track 150 when the first carriage 146 is engaged with the first track 150, as shown in FIG. 5. For example, the motor 172 may enable movement of the first carriage 146 vertically along first vertical axis $V_1$ along the first track 150 based upon desired location for a workpiece 50 and based upon geometry of the workpiece 50. Movement of the first carriage 146 along the first track 150 may be controlled by the control system 600, such as control based upon data 929 collected and sensed by one or more sensor 175.

Figure 10:
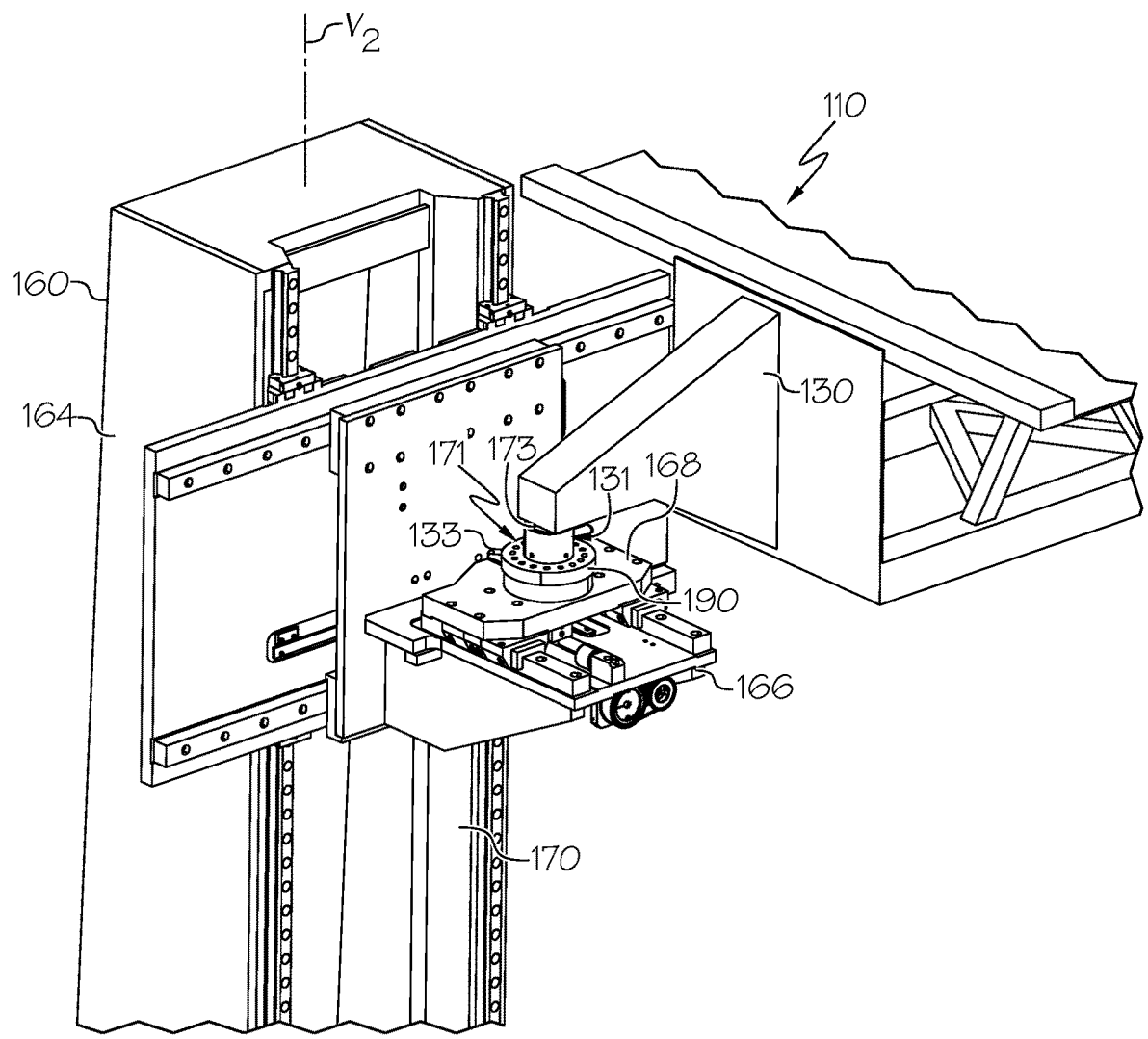
FIG. 10 is a perspective view of a portion of the system of FIG. 1.

Referring to FIG. 10, in one example, the second riser portion 164 includes a second track 170. The second carriage 166 may be configured to engage with the second track 170 and move relative to the second riser portion 164 along the second track 170.

The system 100 may include another motor 172 configured to selectively effect movement of the second carriage 166 along the second track 170. For example, the motor 172 may enable movement of the second carriage 166 vertically along second vertical axis $V_2$ along the second track 170 based upon desired location for a workpiece 50 and based upon geometry of the workpiece 50. Movement of the of the second carriage 166 along the second track 170 may be controlled by the control system 600 based upon data 929 collected and sensed by one or more sensor 175.

Figure 6:
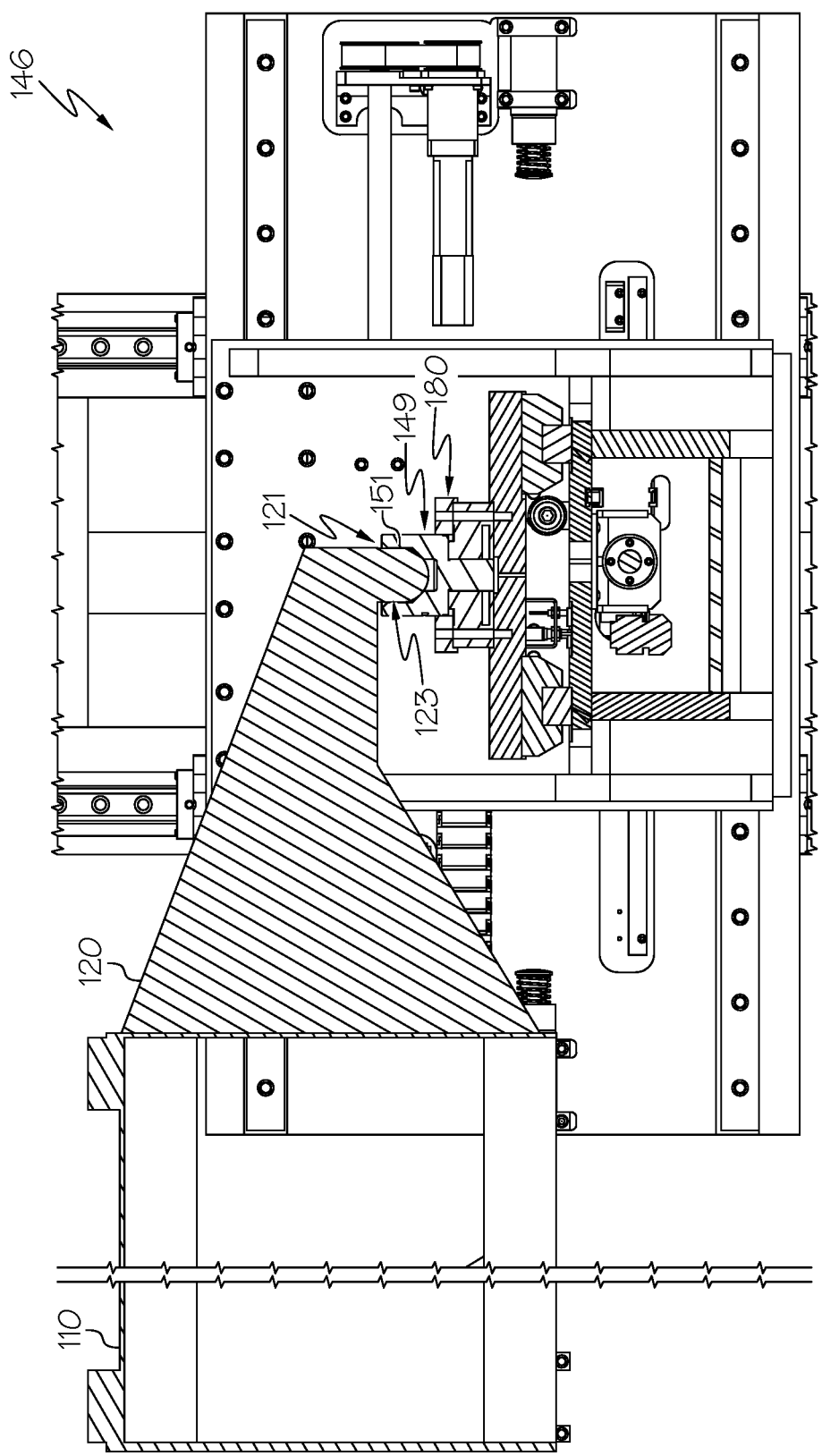
FIG. 6 is a side cross-sectional view of a portion of the system of FIG. 1.

Referring to FIG. 8, in one example, the first beam-side indexing feature 120 includes a first male indexing feature 121. The first frame-side indexing feature 148 includes a first female indexing feature 149 sized and shaped to closely receive the first male indexing feature 121. In one example, the first male indexing feature 121 is or includes a first ball member 123 and the first female indexing feature 149 is or includes a first socket member 151, as shown in FIG. 6. In another example, the first male indexing feature 121 is or includes a generally cone-shaped member and the first female indexing feature 149 is or includes a generally cup-shaped member.

Referring to FIG. 10, in one example, the second beam-side indexing feature 130 includes a second male indexing feature 131 and the second frame-side indexing feature 168 includes a second female indexing feature 171 sized and shaped to closely receive the first male indexing feature 121. In one example, the second male indexing feature 131 is or includes a second ball member 133 and the second female indexing feature 171 is or includes a second socket member 173.

Referring to FIG. 13, in one example, the system 100 includes a first sensor 180 positioned to detect engagement between the first beam-side indexing feature 120 and the first frame-side indexing feature 148. The first sensor 180 is in communication with the control system 600 such that any data 929 collected from the first sensor 180 is sent to the control system 600 for analysis. In one example, the first sensor 180 includes a force sensor 182. In another example, the first sensor 180 includes a motion detector.

Referring to FIG. 13, in one example, the system 100 includes a second sensor 190 positioned to detect engagement between the second beam-side indexing feature 130 and the second frame-side indexing feature 168. The second sensor 190 is in communication with the control system 600 such that any data 929 collected from the second sensor 190 is sent to the control system 600 for analysis. In one example, the second sensor 190 includes a force sensor 182.

Referring to FIG. 1, the system 100 may include a gantry 200 selectively interfaceable with the support beam 110 to move the support beam 110 within the manufacturing environment 10. Gantry 200 may selectively interface with the support beam 110 based upon dimensions of a workpiece 50 for supporting with the support beam 110 in the manufacturing environment. The gantry 200 may selectively interface with the support beam 110 by any suitable mechanical interfacing means. In one example, the gantry 200 is configured to only move the support beam 110 in two directions, the two directions defining a plane P that is generally perpendicular to the first vertical axis $V_1$. The support beam 110 may include a coupling feature 202 positioned to facilitate interfacing the support beam 110 with the gantry 200.

Referring to FIG. 7, in one or more examples, the system 100 for supporting the workpiece 50 in a manufacturing environment 10 includes support beam 110 elongated along a longitudinal axis L. The support beam 110 includes first end portion 112 and second end portion 114 longitudinally opposed from the first end portion 112. The support beam 110 includes first male indexing feature 121 proximate the first end portion 112 and second male indexing feature 131 proximate the second end portion 114.

Figure 3B:
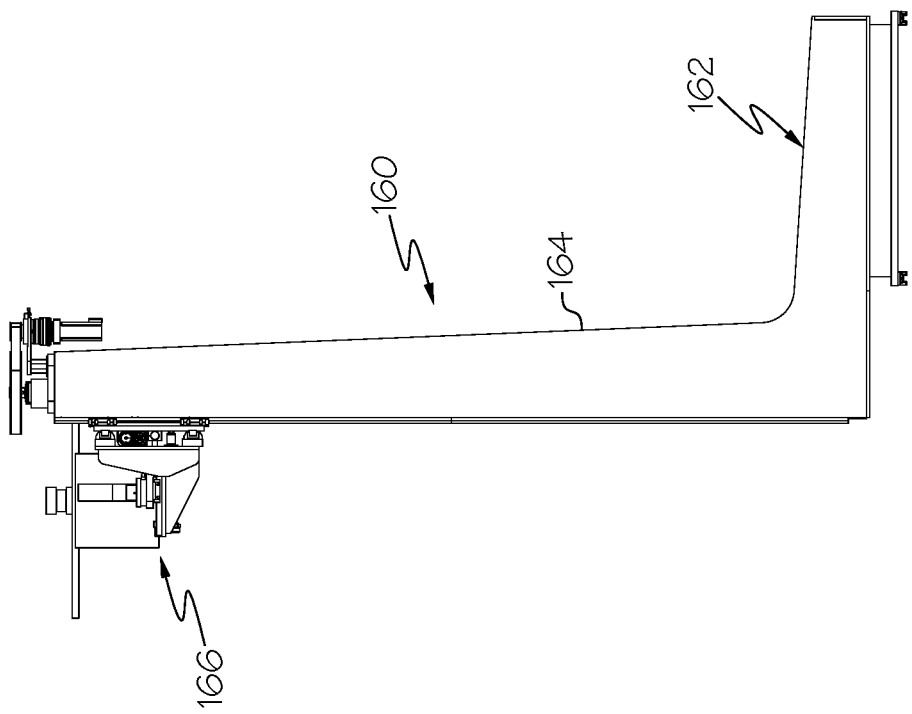
FIG. 3b is a side cross-sectional view of a portion of the system of FIG. 1.
Figure 3A:
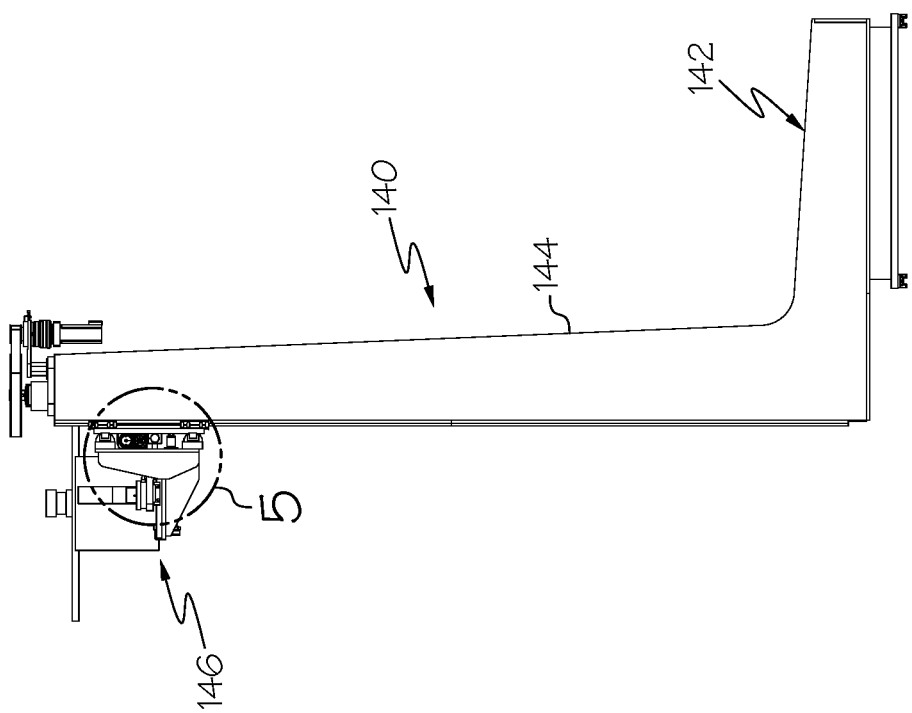
FIG. 3a is a side cross-sectional view of a portion of the system of FIG. 1.

Referring to FIG. 3A and FIG. 7, the system 100 further includes first frame assembly 140 located within one work cell (e.g., 20) of the plurality of work cells 30. The first frame assembly 140 includes first base portion 142, first riser portion 144 defining first vertical axis $V_1$, and first carriage 146. The first carriage 146 is connected to the first riser portion 144 and is moveable relative to the first riser portion 144 along the first vertical axis $V_1$. The first carriage 146 first female indexing feature 149 configured to engage with the first male indexing feature 121.

Referring to FIG. 3B and FIG. 7, the system 100 further includes second frame assembly 160 located within the one work cell (e.g., 20) of the plurality of work cells 30. The second frame assembly 160 includes second base portion 162, second riser portion 164 defining second vertical axis $V_2$, and second carriage 166. The second carriage 166 is connected to the second riser portion 164 and is moveable relative to the second riser portion 164 along the second vertical axis $V_2$. The second carriage 166 includes second female indexing feature 171 configured to engage with the second male indexing feature 131.

Figure 9:
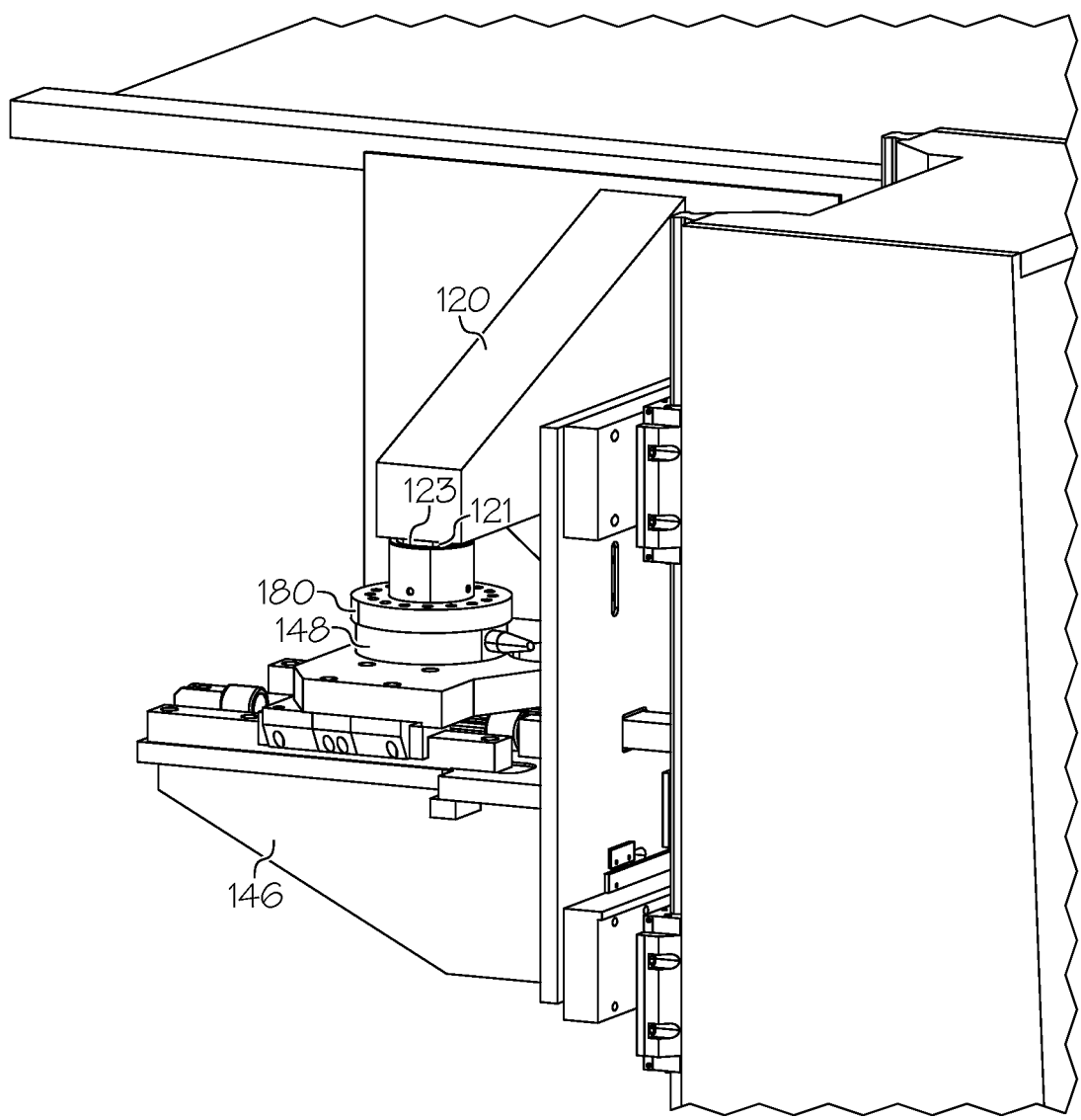
FIG. 9 is a perspective view of a portion of the system of FIG. 1.

Referring to FIG. 9 and FIG. 13, the system 100 may include a first sensor 180. First sensor 180 may be positioned to detect engagement between the first male indexing feature 121 and the first female indexing feature 149. The system 100 may further include a second sensor 190 positioned to detect engagement between the second male indexing feature 131 and the second female indexing feature 171. The first sensor 180 and the second sensor 190 may be in communication with the control system 600 such that they are configured to send sensed data 929 to the control system 600 for analysis.

Figure 12:
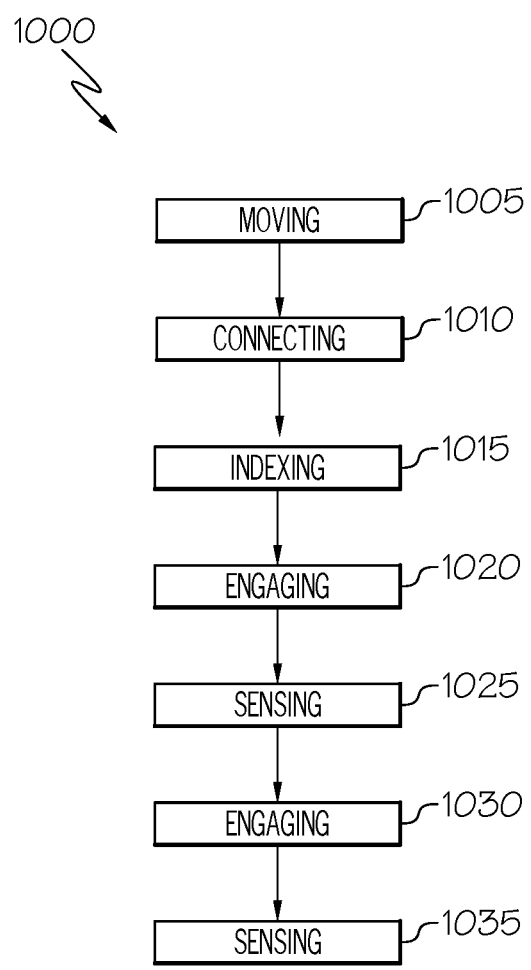
FIG. 12 is a flow diagram of a method for supporting a workpiece in a manufacturing environment.

Referring to FIG. 12, disclosed is a method 1000 for supporting a workpiece 50 in a manufacturing environment 10. The method 1000 may be used in conjunction with the system 100 shown and described herein. In one example, each step of the method 1000 may be automated such that it utilizes a control system 600 to automate each step.

In one example, the method 1000 includes connecting 1010 the workpiece 50 to a support beam 110. The support beam 110 is elongated along a longitudinal axis L. The support beam 110 incudes a first end portion 112 and second end portion 114 longitudinally opposed from the first end portion 112. The support beam 110 further includes a first beam-side indexing feature 120 proximate the first end portion 112 and a second beam-side indexing feature 130 proximate the second end portion 114.

Referring to FIG. 12, the method 1000 includes engaging 1020 the support beam 110 with a first frame assembly 140. In one example, the first frame assembly 140 includes a first base portion 142, a first riser portion 144 defining a first vertical axis $V_1$, and a first carriage 146. The first carriage 146 includes a first frame-side indexing feature 148, see FIG. 8. The first carriage 146 is connected to the first riser portion 144 and moveable relative to the first riser portion 144 along the first vertical axis $V_1$. For example, the first carriage 146 is movable such that it may change position along first vertical axis $V_1$ based upon workpiece 50 geometry and specifications. The engaging 1020 the support beam 110 with the first frame assembly 140 includes moving the first carriage 146 relative to the first riser portion 144 such that the first frame-side indexing feature 148 engages the first beam-side indexing feature 120 of the support beam 110.

Still referring to FIG. 12, the method 1000 further includes engaging 1030 the support beam 110 with a second frame assembly 160. The second frame assembly (160) has a second base portion 162, a second riser portion 164 defining a second vertical axis $V_2$, and a second carriage 166. The second carriage 166 includes a second frame-side indexing feature 168. The second carriage 166 is connected to the second riser portion 164 and moveable relative to the second riser portion 164 along the second vertical axis $V_2$. For example, the second carriage 166 is movable such that it may change position along second vertical axis $V_2$ based upon workpiece 50 geometry and specifications. The engaging 1030 the support beam 110 with the second frame assembly 160 includes moving the second carriage 166 relative to the second riser portion 164 such that the second frame-side indexing feature 168 engages the second beam-side indexing feature 130 of the support beam 110.

Referring to FIG. 12, the method 1000 may include sensing 1025 when the first frame-side indexing feature 148 engages the first beam-side indexing feature 120. The method 1000 may further include sensing 1035 when the second frame-side indexing feature 168 engages the second beam-side indexing feature 130. The data 929 collected from sensing 1025 and 1035 may be analyzed by the control system 600 to determine movement within the system 100.

In example, the engaging 1020 the support beam 110 with the first frame assembly 140 and the engaging 1030 the support beam 110 with the second frame assembly 160 are performed simultaneously. In another example, the engaging 1020 the support beam 110 with the first frame assembly 140 and the engaging 1030 the support beam 110 with the second frame assembly 160 are performed sequentially. In another example, the engaging 1020 the support beam 110 with the first frame assembly 140 and the engaging 1030 the support beam 110 with the second frame assembly 160 includes indexing 1015 the support beam 110 with the first frame assembly 140 and the second frame assembly 160.

Referring to FIG. 12, the method 1000 may include moving 1005 the support beam 110 to a position proximate the first frame assembly 140 and the second frame assembly 160 prior to the engaging the support beam 110 with the first frame assembly 140 and the engaging the support beam 110 with the second frame assembly 160. In one example, the moving 1005 the support beam 110 includes moving 1005 the support beam 110 with a gantry 200. In another example, the moving 1005 the support beam 110 includes moving 1005 the support beam 110 in only two directions, the two directions defining a plane P that is generally perpendicular to a first vertical axis $V_1$ defined by the first frame assembly 140.

Figure 14:
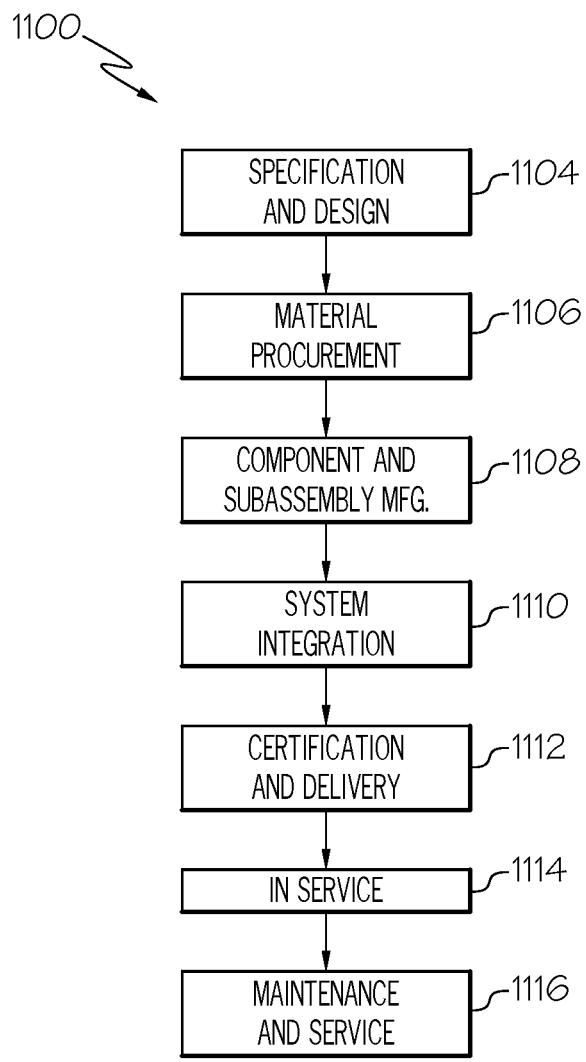
FIG. 14 is a flow diagram of an aircraft manufacturing and service methodology.

Examples of the subject matter disclosed herein may be described in the context of aircraft manufacturing and service method 1100 as shown in FIG. 14 and aircraft 1102 as shown in FIG. 15. During pre-production, service method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The disclosed systems and methods for supporting a workpiece in a manufacturing environment may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114), such as by employing the disclosed systems and methods for supporting a workpiece in a manufacturing environment. Also, one or more examples of the disclosed systems and methods for supporting a workpiece in a manufacturing environment may be utilized during production stages, i.e. component and subassembly manufacturing (block 1108) and manufacturing and system integration (block 1110), for example, by substantially expediting assembly of or reducing the cost of aircraft 1102. Similarly, one or more examples of the disclosed systems and methods for supporting a workpiece in a manufacturing environment may be utilized, for example and without limitation, while aircraft 1102 is in service (block 1114) and/or during maintenance and service (block 1116).

The disclosed systems and methods for supporting a workpiece in a manufacturing environment are described in the context of an aircraft. However, one of ordinary skill in the art will readily recognize that the disclosed systems and methods for supporting a workpiece in a manufacturing environment may be utilized for a variety of applications. For example, the disclosed systems and methods for supporting a workpiece in a manufacturing environment may be implemented in various types of vehicles including, e.g., helicopters, watercraft, passenger ships, automobiles, and the like.

Although various examples of the disclosed systems and methods for supporting a workpiece in a manufacturing environment have been shown and described, modifications may occur to those skilled in the art upon reading the specification. The present application includes such modifications and is limited only by the scope of the claims.

What is claimed is:

1. A system for supporting a workpiece in a manufacturing environment, the system comprising:
   a support beam that is elongated along a longitudinal axis and comprises a first end and a second end longitudinally opposed from the first end;
   a first beam-side index, comprising a first cone-shaped projection that is coupled to and that projects downward from the first end of the support beam;
   a second beam-side index, comprising a second cone-shaped projection that is coupled to and that projects downward from the second end of the support beam;
   at least one hanger suspending from the support beam and configured for coupling the workpiece below the support beam in a known workpiece location relative to the support beam based on a geometry of the workpiece;
   a first frame comprising a first base and a first riser defining a first vertical axis;
   a first carriage coupled to the first riser, wherein the first carriage moves relative to the first riser along the first vertical axis, receives the first end of the support beam, and supports the first end of the support beam along the first vertical axis;
   a first frame-side index, comprising a first socket that is coupled to the first carriage and that mates with the first beam-side index to locate the first end of the support beam at a first known index location relative to the first carriage;
   a second frame comprising a second base and a second riser defining a second vertical axis;
   a second carriage coupled to the second riser, wherein the second carriage moves relative to the second riser along the second vertical axis, receives the second end of the support beam, and supports the second end of the support beam along the second vertical axis;
   a second frame-side index, comprising a second socket that is coupled to the second carriage and that mates with the second beam-side index to locate the second end of the support beam at a second known index location relative to the second carriage; and
   a computer controller programmed to instruct movement of the first carriage along the first vertical axis and the second carriage along the second vertical axis to selectively position the workpiece based on the known workpiece location, the first known index location and the second known index location.

2. The system of claim 1, wherein the manufacturing environment comprises a plurality of work cells, and wherein both the first frame and the second frame are located within one work cell of the plurality of work cells.

3. The system of claim 2, further comprising a gantry configured to move the support beam between the plurality of work cells,
wherein
the gantry moves the support beam in two directions, the two directions defining a plane that is perpendicular to the first vertical axis.

4. The system of claim 3, wherein the support beam comprises a coupling positioned to facilitate interfacing the support beam with the gantry.

5. The system of claim 1, comprising the workpiece, wherein the workpiece is suspended from the support beam via the hanger.

6. The system of claim 1, wherein:
the first riser comprises a first track, and wherein the first carriage is engaged with the first track and is moveable relative to the first vertical axis and first riser along the first track; and
the second riser comprises a second track, and wherein the second carriage is engaged with the second track and moveable relative to the second vertical axis and second riser along the second track.

7. The system of claim 6, further comprising at least one motor that selectively effects movement of the first carriage relative to the first vertical axis along the first track and selectively effects movement of the second carriage relative to the second vertical axis along the second track.

8. The system of claim 1, further comprising:
a first sensor positioned to detect engagement between the first beam-side index and the first frame-side index; and
a second sensor positioned to detect engagement between the second beam-side index and the second frame-side index.

9. The system of claim 8, wherein at least one of the first sensor and the second sensor comprises a force sensor.

10. The system of claim 1, wherein:
mating of the first beam-side index and the first frame-side index aligns the first beam-side index along the first vertical axis; and
mating of the second beam-side index and the second frame-side index aligns the second beam-side index along the second vertical axis.

11. A system for supporting a workpiece in a manufacturing environment, the manufacturing environment comprising a plurality of work cells, the system comprising:
a gantry that moves between the plurality of work cells;
a support beam configured to be coupled to the gantry and selectively released from the gantry, wherein the gantry moves the support beam through the plurality of work cells while coupled to the gantry, and wherein the support beam is elongated along a longitudinal axis and comprises a first end and second end longitudinally opposed from the first end;
a first male index coupled to and projecting downwardly from the first end of the support beam;
a second male index coupled to and projecting downwardly from the second end of the support beam;
at least one hanger suspending from the support beam and configured for coupling the workpiece below the support beam in a known workpiece location relative to the support beam based on a geometry of the workpiece;
a first frame located within one work cell of the plurality of work cells, the first frame comprising a first base and a first riser defining a first vertical axis;
a first carriage coupled to the first riser, wherein the first carriage moves relative to the first riser along the first vertical axis, receives the first end of the support beam before the support beam is released from the gantry, and supports the first end of the support beam along the first vertical axis after the support beam is released from the gantry;
a first female index coupled to the first carriage, wherein the first female index engages the first male index from below in response to the first carriage moving along the first vertical axis toward the support beam before the support beam is released from the gantry and locates the first end of the support beam at a first known index location relative to the first carriage;
a second frame located within the one work cell of the plurality of work cells, the second frame comprising a second base and a second riser defining a second vertical axis;
a second carriage coupled to the second riser, wherein the second carriage moves relative to the second riser along the second vertical axis, receives the second end of the support beam before the support beam is released from the gantry, and supports the second end of the support beam along the second vertical axis after the support beam is released from the gantry;
a second female index coupled to the second carriage, wherein the second female index engages the second male index from below in response to the second carriage moving along the second vertical axis toward the support beam after the support beam is released from the gantry and locates the second end of the support beam at a second known index location relative to the second carriage; and
a computer controller programmed to instruct movement of the first carriage along the first vertical axis and the second carriage along the second vertical axis to selectively position the workpiece in the one work cell based on the known workpiece location, the first known index location, and the second known index location,
wherein the first male index comprises a first downward cone-shaped projection in relation to the first vertical axis that extends from the first male index member to mate with the first female index and the second male index comprises a second downward cone-shaped projection in relation to the second vertical axis that extends from the second male index to mate with the second female index.

12. The system of claim 11, further comprising:
a first sensor positioned to detect engagement between the first male index and the first female index; and
a second sensor positioned to detect engagement between the second male index and the second female index.

13. The system of claim 11, wherein the gantry moves the support beam in two directions, the two directions defining a plane that is perpendicular to the first vertical axis.

14. A method for supporting a workpiece in a manufacturing environment, the method comprising:
coupling a support beam to a gantry;
connecting the workpiece to at least one hanger suspended from the support beam, the at least one hanger located such that the workpiece is suspended from the hanger below the support beam, wherein the at least one hanger positions the workpiece in a known workpiece location relative to the support beam based on a geometry of the workpiece;

moving the support beam relative to a first frame and a second frame using the gantry;

moving a first carriage relative to a first riser of the first frame along a first vertical axis toward a first end of the support beam;

moving a second carriage relative to a second riser of the second frame along a second vertical axis toward a second end of the support beam;

engaging a first beam-side index, coupled to the first end of the support beam, and a first frame-side index, coupled to the first carriage, in response to moving the first carriage along the first vertical axis toward the first end of the support beam while the support beam is coupled to the gantry;

indexing the first end of the support beam at a first known index location in response to engaging the first beam-side index and the first frame-side index;

engaging a second beam-side index coupled to the second end of the support beam, and a second frame-side index, coupled to the second carriage, in response to moving the second carriage along the second vertical axis toward the second end of the support beam while the support beam is coupled to the gantry;

indexing the second end of the support beam at a second known index location in response to engaging the second beam-side index and the second frame-side index;

supporting the first end of the support beam by the first carriage while the support beam is coupled to the gantry;

supporting the second end of the support beam by the second carriage while the support beam is coupled to the gantry;

releasing the support beam from the gantry while supporting the first end with the first carriage and supporting the second end with the second carriage;

moving the first carriage along the first vertical axis and moving the second carriage along the second vertical axis after releasing the support beam from the gantry to selectively position the workpiece based on the known workpiece location, the first known index location, and the second know index location.

15. The method of claim 14, wherein the engaging the support beam with the first frame and the engaging the support beam with the second frame are performed simultaneously.

16. The method of claim 14, further comprising receiving the first end of the support beam by the first carriage prior to receiving the second end of the support beam by the second carriage in response to moving the first carriage and the second carriage before releasing the support beam from the gantry.

17. The method of claim 14, wherein:
the manufacturing environment comprises a plurality of work cells; and
the moving the support beam comprises moving the support beam between the plurality of work cells using the gantry.

18. The method of claim 14, wherein the moving the support beam comprises moving the support beam in two directions, the two directions defining a plane that is perpendicular to the first vertical axis defined by the first frame.

19. The method of claim 14, wherein:
the support beam is elongated along a longitudinal axis and comprises the first end and the second end longitudinally opposed from the first end;
the first beam-side index projects downwardly from the first end and the second beam-side index projects downwardly from the second end;
the first frame-side index engages the first beam-side index of the support beam from below in response to moving the first carriage toward the first end of the support beam while the support beam is coupled to the gantry; and
the second frame-side index engages the second beam-side index of the support beam from below in response to moving the second carriage toward the second end of the support beam while the support beam is coupled to the gantry.

20. The method of claim 14, further comprising:
sensing when the first frame-side index engages the first beam-side index; and
sensing when the second frame-side index engages the second beam-side index.

* * * * *